(12) United States Patent
Schmid et al.

(10) Patent No.: US 7,628,345 B2
(45) Date of Patent: Dec. 8, 2009

(54) MEAT MINCING MACHINE

(75) Inventors: Klaus Schmid, Daugendorf (DE);
Siegfried Reutter, Eberhardzell (DE);
Manfred Baechtle, Schemmerhofen (DE); Wolfgang Braig, Laupheim (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 145 days.

(21) Appl. No.: 11/890,033

(22) Filed: Aug. 3, 2007

(65) Prior Publication Data
US 2008/0035767 A1   Feb. 14, 2008

(30) Foreign Application Priority Data
Aug. 3, 2006   (EP)   ................... 06016258

(51) Int. Cl.
*B02C 18/30*   (2006.01)
(52) U.S. Cl. .............. 241/30; 241/34; 241/82.5
(58) Field of Classification Search ....... 241/82.1–82.7, 241/34, 30
See application file for complete search history.

(56) References Cited

U.S. PATENT DOCUMENTS 5,147,376 A      9/1992   Pianetti et al.
7,395,980 B2*    7/2008   Haack et al. ............... 241/82.5

FOREIGN PATENT DOCUMENTS

DE   10312605   10/2004
EP     900595    3/1999

\* cited by examiner

*Primary Examiner*—Mark Rosenbaum
(74) *Attorney, Agent, or Firm*—Marshall, Gerstein & Borun LLP (57) ABSTRACT

A meat mincing machine and a method of producing minced foodstuffs, in particular minced meat, with an inlet, at least one blade on a following perforated disc, as well as with a separating device for separating and drawing off hard constituents wherein, to improve the weight accuracy, it has a device for the determination of the drawn-off amount of separated product.

44 Claims, 7 Drawing Sheets

MEAT MINCING MACHINE

CROSS-REFERENCE TO RELATED APPLICATION

The present application claims the benefit of priority of European Patent Application No. 06 016 258.3 filed Aug. 3, 2006. The entire text of the priority application is incorporated herein by reference in its entirety.

FIELD OF THE DISCLOSURE

The disclosure relates to a meat mincing machine and a method of mincing foodstuffs, in particular for the production of minced meat

BACKGROUND OF THE DISCLOSURE

A meat mincing machine and a method of this nature are already known from the publication DE 10312605 A1. This publication describes a meat mincing machine for the production of minced foodstuffs with at least one blade and a following perforated disc and a separating device. In the publication an externally driven discharge screw is arranged in a discharge tube. This discharge screw is used to facilitate the quality-compatible mincing and sorting of raw materials independently of the ram pressure. The screw is externally driven. This external drive is for example a pneumatic motor, which facilitates the closed and open-loop control of the discharge screw, without interfering with the drive system of the meat mincing machine.

From the publication EP-A1-0900595 a set of separating cutters for machines for mincing meat is also already known. Here too it is already known per se that hard and stringy constituents of the product to be cut in the set of separating cutters are drawn off transverse to the conveying direction of the mincing machine. From U.S. Pat. No. 5,417,376 a device is also already known which allows the sorting of bones and other hard constituents from the foodstuff to be processed.

Meat mincing machines are used in the food industry for the mincing of foodstuffs, in particular minced meat. Here, the meat is put into a charging muff and pressed by a conveyor device against a multi-bladed cutter. The cutter minces the meat which is then pressed out of the meat mincing machine through a perforated disc. Also, sets of cutters are known with a number of blades and a number of perforated discs.

Undesired, hard and solid constituents of the meat, such as for example tendons, sinews, rind, bone fragments, connective tissue and possible non-meat constituents, such as for example metal parts such as clips, etc. cannot be sufficiently minced by the cutter nor pressed through the perforated disc. For this reason there are meat mincing machines with appropriate separating devices for separating hard constituents of this nature.

Basically, there are two types of separating and sorting devices. Meat mincing machines with internal separation on one hand and meat mincing machines with external separation on the other.

All these separating devices have the disadvantage that due to the separated material, inaccuracies in the weight of the portions occur with mincing machines in which the minced meat is filled directly into the casing from the mincing machine. These weight inaccuracies also occur with mincing systems with which portions of minced meat are produced for immediate insertion into packaging machines.

SUMMARY OF THE DISCLOSURE

It is therefore the object of the disclosure to provide a meat mincing machine and a method, which facilitate the separation of hard parts and however facilitate a high weight accuracy of the portions produced.

Due to the fact that according to the disclosure a device for determining the discarded amount of hard constituents, i.e. of the amount of separated product, is provided, it can be determined which quantity, i.e. which volume or which mass, is discharged in a certain time period by the meat mincing machine, not as for example minced meat, but rather separated by the separating device and drawn off. The determination of the amount of separated product or of the temporal progression of the separated product facilitates correcting intervention in the production process and compensation of this missing volume, for example by increasing the volume flow fed to the meat mincing machine. The term "determine" is taken to mean the acquisition of the quantity, irrespective of whether it is by measurement or the specific control of the amount of product to be separated.

The meat mincing machine according to the disclosure moreover comprises a control device which causes a corresponding amount of food to be minced to be added to the portions to be produced in dependence of the determined amount drawn off by the separating device. Thus it can be ensured that the portions made can be produced with very high weight accuracy.

The addition of the separated volume for the weight compensation facilitates the production of portions with accurate weight. Thus it is possible to reliably remove hard and solid constituents, such as for example tendons, sinews, rind, bone fragments, connective tissue as well as non-meat constituents, such as for example metal parts and clips, from the soft meat. This means that weight variations can be compensated or at least reduced to a minimum.

In achieving this, the meat mincing machine comprises a conveying mechanism or it can be connected to a conveying mechanism, such as for example, that of a filling mincer. The conveying mechanism charges the meat mincing machine with the foodstuff to be minced.

According to a preferred embodiment the device for determining the drawn-off amount of separated product has a conveying device which is arranged at the outlet or in a discharge pipe of the separating device. The conveying device can for example be driven by a motor, wherein then the amount conveyed by the conveying device corresponds to the drawn-off amount of hard constituents. This means that for example the volume separated in a certain time period can be determined using the rotated angle of the conveying device and the amount taken in by the conveying device. A driven conveying device of this nature facilitates a driven and controlled drawing off of the separated product with blockages and constrictions being prevented.

In this respect, the conveyed amount of the conveying device can be set dependent on the throughput of the meat mincing machine. Since this is difficult to determine, the conveyed amount of the conveying device can also be set in dependence of the throughput of the conveying mechanism. Here, the drive of the conveying device can be coupled to the drive of the conveying mechanism preferably via a gear train. The drives can also be separate. With separate drives a separation independent of the throughput is conceivable.

This active device permits a continual separation which is in the end independent of pressure variations.

According to a further embodiment of the disclosure the conveying device is not driven separately by a motor, but rather it is driven by the pressure and movement of the drawn-off hard constituents, wherein then a measurement device can be also provided, which determines the conveyed amount via the drive of the conveying device. As previously mentioned, the separated volume can be determined for example by the rotated angle of a pump shaft and the amount taken in by a pump.

Preferably, the conveying device comprises a controlled brake, through which the conveying mechanism, i.e. the pump, can be braked in a controlled manner, so that the amount optionally and additionally fed to the meat mincing machine is not increased due to the separated volume such that in turn more is separated and the closed-loop control oscillates uncontrollably upwards.

The device for determining the drawn-off amount of separated product can however also comprise a flowmeter or also a continuously operating weighing system.

It is advantageous if the device for the determination of the amount of separated product comprises a control device which controls the conveying device or the controlled brake in order to draw off a defined amount of separated product in dependence of the quality of the foodstuff to be minced. Since the starting material is generally supplied to the meat-processing facilities ready-cut and in defined quality classes, a certain amount or proportion of separated product (e.g. between 3 and 10%) of the meat to be minced can be defined, whereby the conveying device draws off the corresponding amount of separated product.

Preferably, the device for determining the amount of separated product determines the volume of the separated product.

Preferably, the meat mincing machine comprises at least one sensor, which supplies a signal to a controller in dependence of the composition of the separated product or of the minced foodstuff, the said controller controlling the conveying device or the controlled brake in dependence of the signal. Preferably, the sensor is a colour sensor, which in particular determines the red or white proportion of the separated product or minced foodstuff. The setting of the amount of separated product occurs on the basis of the color of the separated product. With a high red proportion of the separated product it contains too much valuable muscular meat, i.e. too much is being separated. If the separated product is only white, there is the risk that not sufficient hard parts are being separated and for example too much connective tissue is being discharged in the finished portions or the final perforated disc becomes blocked. It must therefore be ensured that a certain proportion of meat is contained in the separated product which can be detected by its color. The sensors enable the conveying device to deliver an appropriate amount of separated product.

In this respect, the sensors can be provided at the outlet of the separating device and/or at the outlet of the meat mincing machine and/or in the region of the separating device.

Advantageously the meat mincing machine is formed such that the control device controls the conveying mechanism such that the conveyed throughput is increased such that the determined amount of separated product is compensated.

According to the disclosure the drawn-off amount of separated product, for example in the form of the volume or the mass, and/or the temporal progression of the drawn-off amount of separated product of hard constituents, i.e. the mass or volume per unit time, can be determined.

The method according to the disclosure facilitates the continuous determination of the drawn-off amount during the process, so that corrective intervention in the process is possible at any time and without temporal delay.

BRIEF DESCRIPTION OF THE DRAWINGS

The disclosure is explained in more detail in the following with reference to the figures. The following are illustrated.

DETAILED DESCRIPTION OF THE DISCLOSURE

Figure 1:
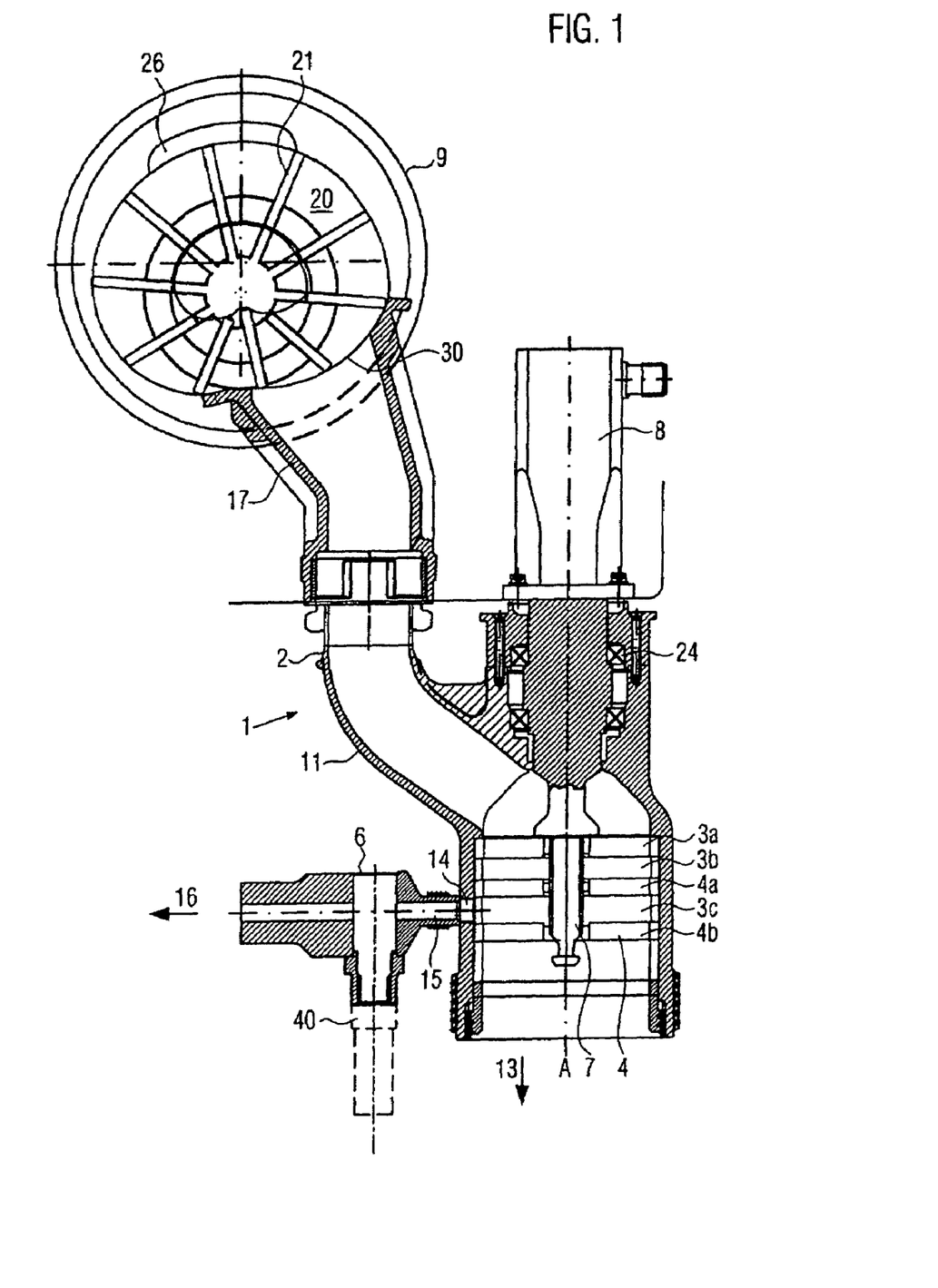
FIG. 1 a section through a meat mincing machine with conveying mechanism according to the disclosure, FIG. 2 a filling mincer, which comprises a meat mincing machine according to the disclosure, FIG. 3 an example of a separating device, FIG. 4 an example of a separating device, FIG. 5 a set of cutters for a meat mincing machine with external separation, FIG. 6 a flow chart of the method according to the disclosure, FIG. 7 a further embodiment of the disclosure which comprises a color sensor, FIG. 8 a much simplified block diagram of the control device according to an embodiment of the disclosure.
Figure 2:
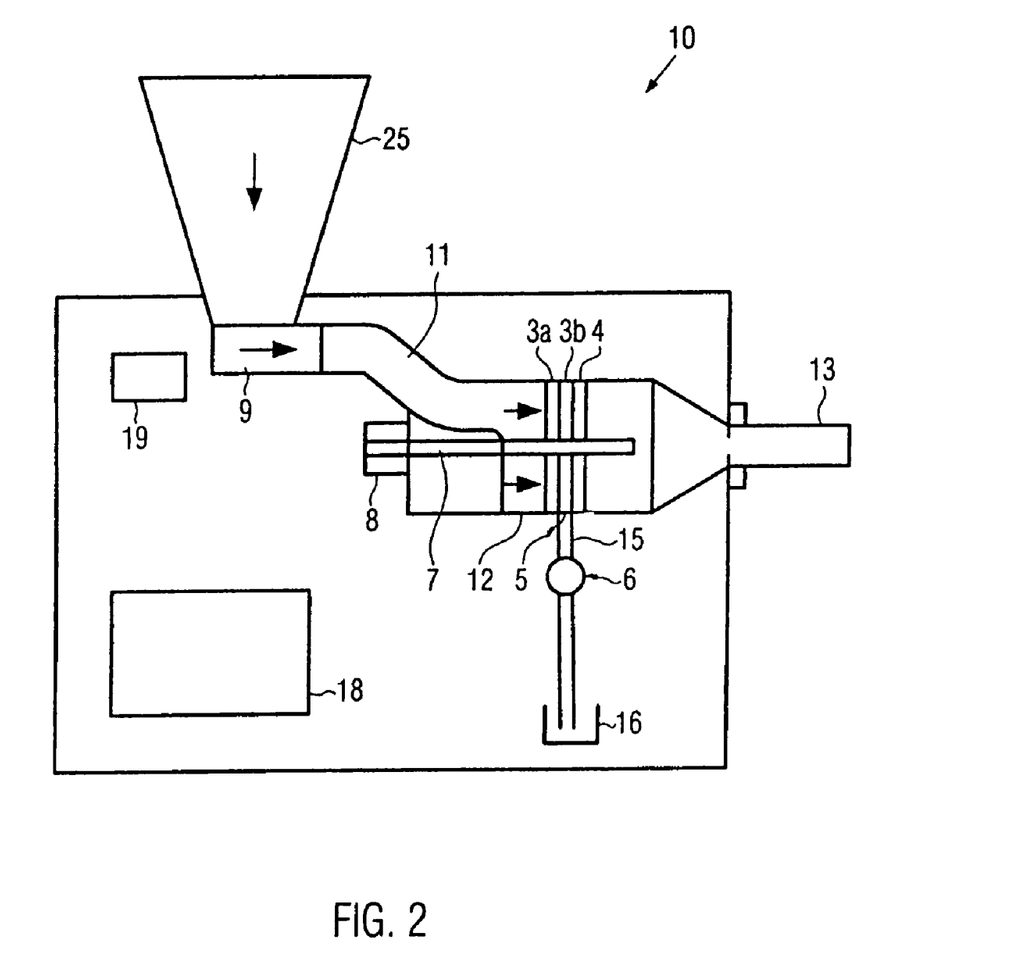

FIG. 1 shows a cross-section through a possible embodiment of a meat mincing machine 1 according to the disclosure. FIG. 2 shows schematically a longitudinal section through the filling mincer 10, which comprises a meat mincing machine 1 according to the disclosure.

As can be seen from FIG. 2, here the meat mincing machine 1 is integrated into a filling mincer 10. The reference numeral 25 designates a filling hopper through which coarsely chopped foodstuff, here coarsely chopped meat, is fed to the meat mincing machine 1. Connected to the filling hopper 25, a conveying mechanism 9 is provided, for example the vane pump 9 illustrated in FIG. 1, which conveys the meat to be minced at a certain conveying rate, i.e. a certain volume flow, to the set of cutters 3, 4. Instead of the vane pump 9 also other pumps, feed screws, etc. can of course be used. The vane pump illustrated in FIG. 1 is already known from the state of the art (for example from EP 04 323 88 B2 and EP 10 407 58 A1) and is not explained in further detail. The vane pump here has an inlet 26 for the coarsely chopped meat and radially movable vanes 21, which rotate in the direction of the arrow P, wherein the meat enters the chambers 20 of the vane pump 9 via the feed 26 and is ejected in the direction of the pump outlet 30 which opens into the connection piece 17. Thus the meat is pushed in the direction of the inlet 2 of the meat mincing machine 1. The connecting pipe 11 leads to the following set of cutters. In a manner known per se, the set of cutters comprises at least one stationary precutter 3a, a blade 3b and at least one following stationary perforated disc 4. In this embodiment the set of cutters has, for example, a precutting blade with a plain bearing 3a, a blade 3b driven by the shaft 7, a stationary perforated disc 4a, a hollow-arm blade 3c driven by the shaft 7 as well as a stationary finely perforated disc 4b. The finely perforated discs have a round cross-section, as does the interior of the housing 12 in this region.

The separation occurs preferably before the finely perforated disc 4b, but can however take place before any other perforated disc.

For driving the shaft 7 an electric motor 8 is provided, which rotates the shaft 7 about the axle A, by means of which the cutters 3b, 3c mounted on the shaft 7 are rotated about the axle A. The motor 8 is arranged on the housing 12 of the meat mincing machine, wherein the drive shaft is mounted for rotation in the housing using appropriate bearings 24.

According to the disclosure the meat mincing machine 1 has, as can be seen best in FIG. 1, a device 5 which enables hard constituents contained in the meat to be separated and drawn off. Hard constituents of this nature cannot be minced in an adequate manner by the blade nor pressed through the perforated disc 4b, which is a finely perforated disc. Hard constituents of this nature are for example tendons, sinews, rind, bone fragments, connective tissue and possible non-meat constituents, such as for example metal parts, clips, etc.

Basically, there are two types of separating and sorting devices:

On one hand there are meat mincing machines with internal separation and on the other hand there are meat mincing machines with external separation.

Figure 3:
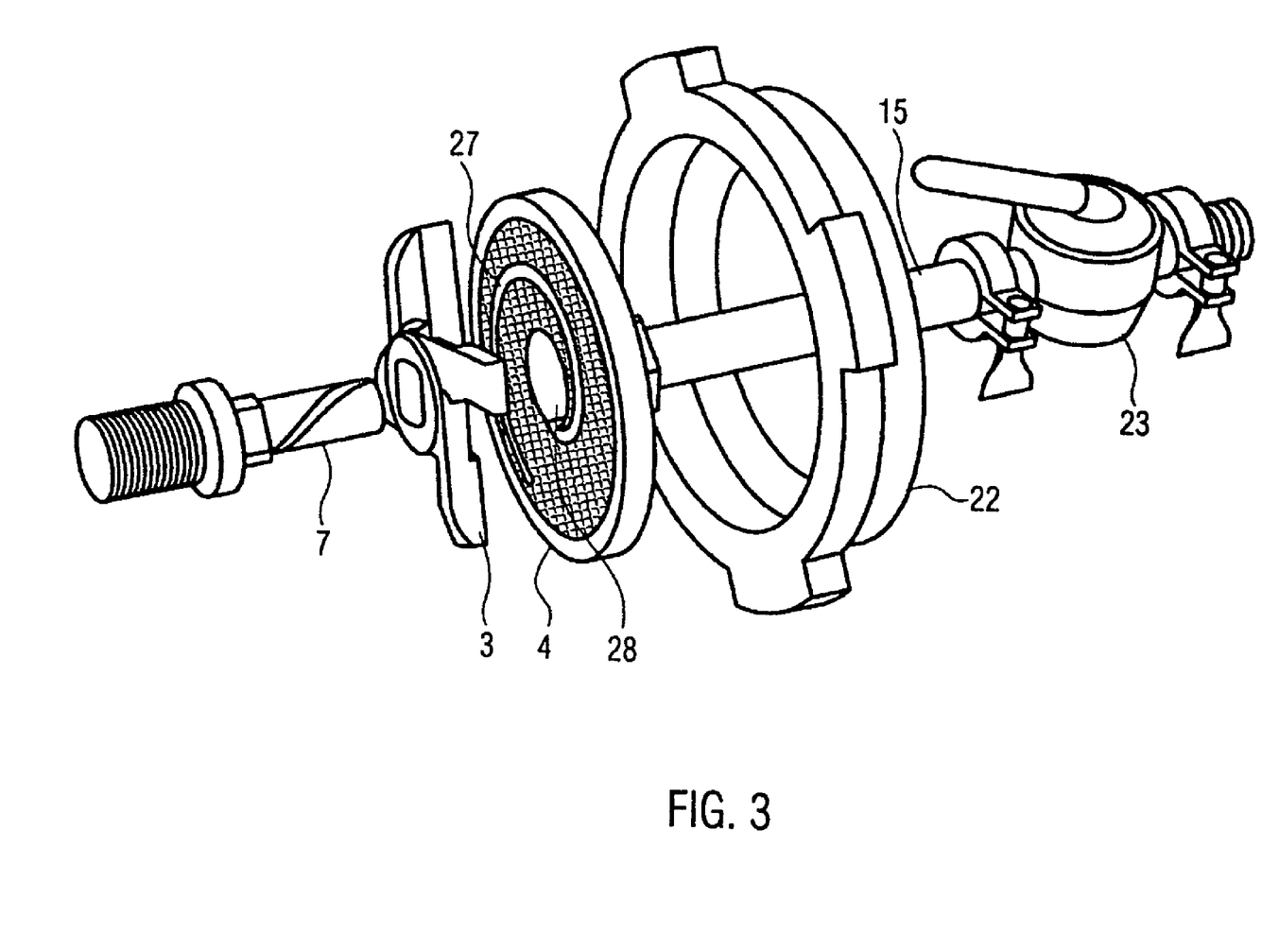

FIG. 3 illustrates an example of internal separation. For the sake of simplicity only one blade 3 and one final perforated disc 4 are shown. With 22 a union nut is designated which is to be attached to the housing of the meat mincing machine. Spiral or star-shaped grooves 27, which lead to a central recess 28 which is in turn joined to the discharge pipe 15, are provided in the final perforated disc 4. The spiral or star-shaped grooves are used to convey the hard parts to the center and to the cutter pin 7. On rotating the blade the hard constituents, which are larger than the holes of the following perforated disc 4, tend to move to the center of the perforated disc, i.e. to the recess 28. These hard constituents can move inwards in the spiral grooves. Here, the cutter pin 7 or the shaft, which drives the separating cutter 3, has for example a spiral-shaped conveying channel, which extends to the front to the discharge pipe 15 and which thus realises the ejection of the unwanted constituents conveyed to the center. The hard constituents are then discharged via the pipe 15. A shut-off valve 23 or flow control valve can be provided in the pipe 15.

Alternatively or additionally, the hard constituents can be conveyed to the center by a multi-blade separating cutter with cutting edges directed inwards.

Figure 4:
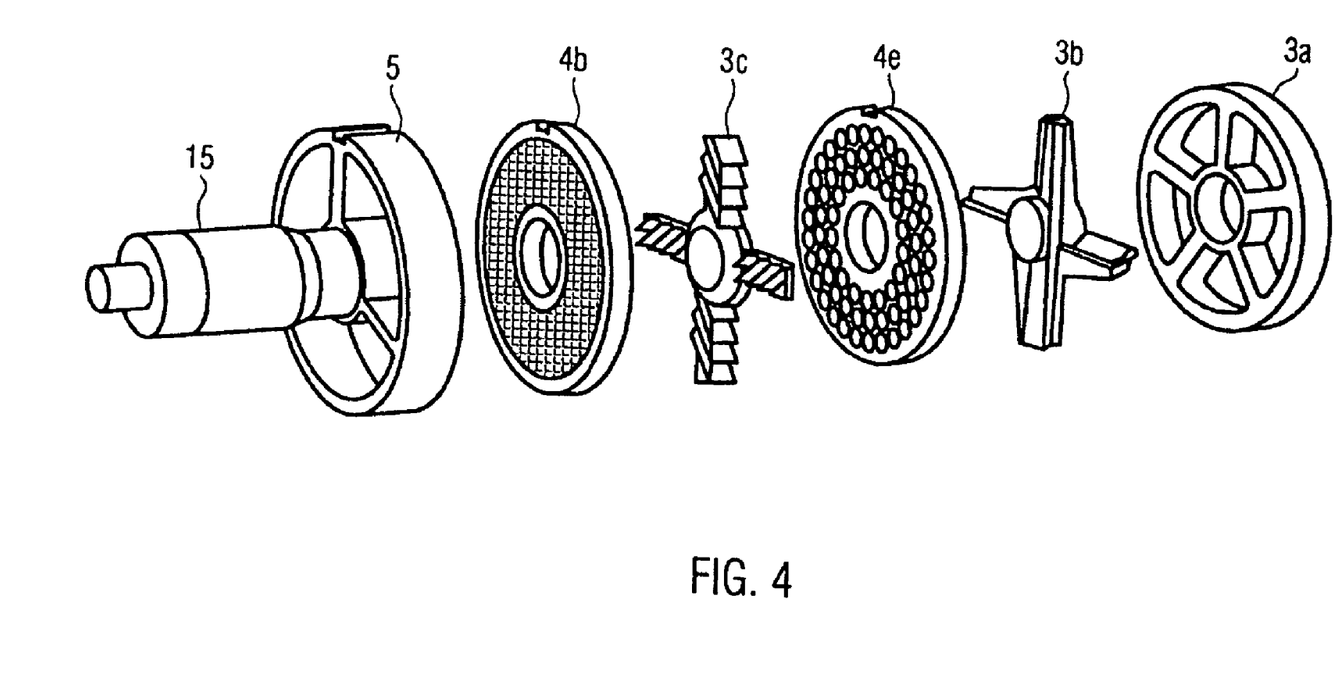

FIG. 4, for example, illustrates a cutter set which shows a separating cutter 3c of this nature. The set of cutters illustrated in FIG. 4 comprises a precutter with plain bearing 3a, a cross-cutter with four blades 3b, a coarse perforated disc 4a and a separating cutter 3c with blades directed inwards. The blades of the separating cutter 3c point to the finely perforated disc 4b and extend diagonally to the central axle A. Due to the blades directed inwards, the hard constituents are deflected to the center and can then, as can be seen in FIG. 4, be ejected out of the meat mincing machine via the discharge pipe 15 by the pressure in the meat mincing machine.

Of course it is also possible to combine the spiral or star-shaped grooves in the perforated disc 4 with a multi-blade separating cutter with cutting edges directed inwards.

Figure 5:
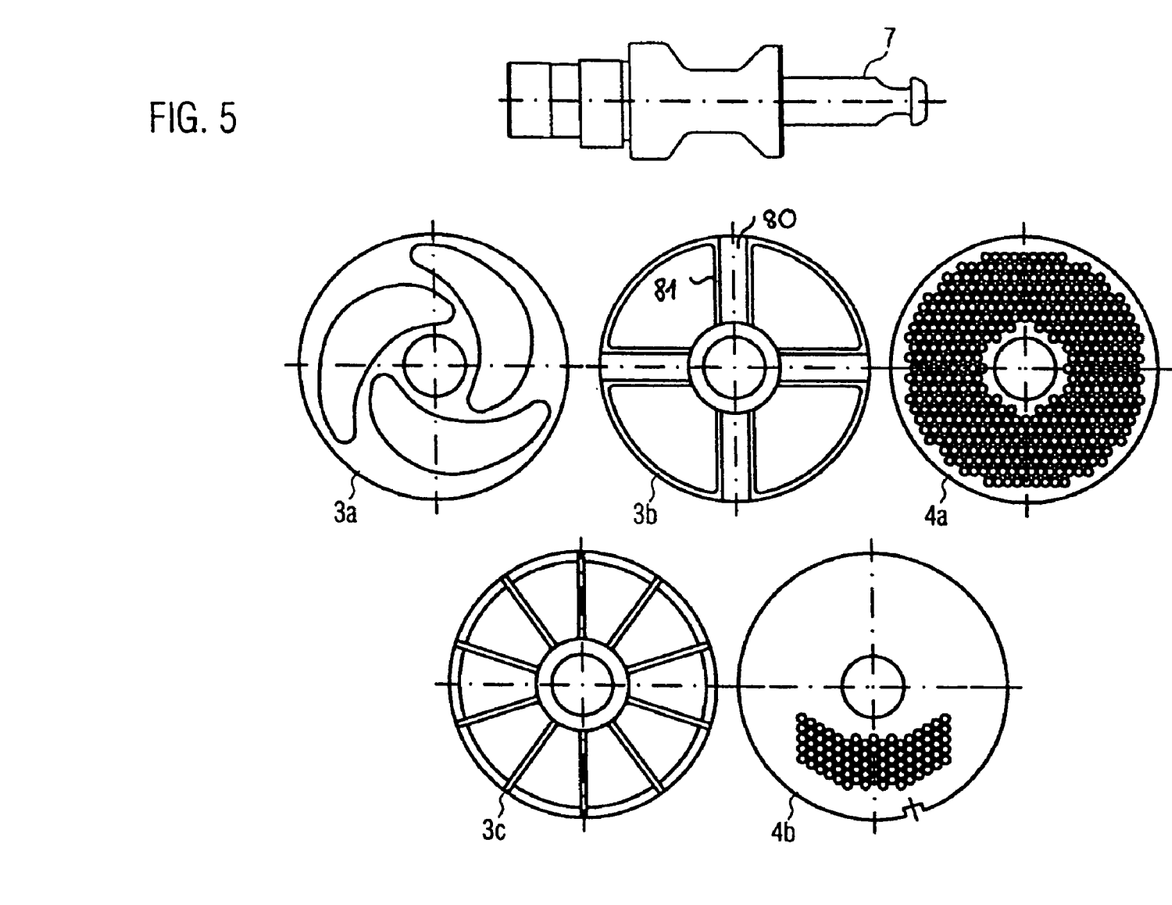

As already mentioned, there are also meat mincing machines with external separation. Here, the separating cutter 3b has for example hollow cutting arms 81. A set of cutters of this nature is illustrated in FIG. 5 and comprises for example the precutter 3a, the hollow arm cutter 3b, the finely perforated disc 4a, another cutter 3c and a final perforated disc 4b, which in this embodiment is formed as a perforated field only in a partial region. The separating cutter, for example, here has a number of radially extending cavities 80, which are open to the outside and bordered at the sides in each case by two cutting edges. The cavities are directed to the perforated disc 4a. With the hollow-arm separating cutter 3b the hard parts collect at the internal diameter and are passed through the hollow arms to the outside as a consequence of the pressure of the minced meat. In the housing 12 an appropriate opening 14 is provided through which the hard constituents, which are drawn-off to the outside by the hollow arms, are ejected and discarded into a discharge pipe 15.

In FIG. 1 a separating device is shown which here comprises a hollow arm cutter 3c, as illustrated in FIG. 5, wherein in the housing 12 of the meat mincing machine the opening 14 is arranged, which in turn is joined to the discharge pipe 15 to draw off the hard constituents.

During separation the mass flow is divided up into a flow, which is passed through the openings of the stationary final perforated disc 4b and a small partial flow, which is separated by the separating device and passed out via the pipe 15. As illustrated in FIG. 2, the amount of hard constituents can for example be passed to a container 16 provided for this.

According to the disclosure the meat mincing machine comprises a device 6, 19, 40 for determining the discarded amount of hard constituents or the amount of separated product. "Amount" here is for example taken to mean the volume or the mass. The device 6, 19, 40 here acquires the amount of hard constituents or separated product drawn off in a certain time interval $\Delta t$ or the temporal progression of the drawn-off amount or for example the drawn-off amount of hard constituents arising during the mincing of a certain amount of meat. Thus the disadvantage of the previously usual uncontrolled separation can be compensated. Due to the fact that the drawn-off amount of hard constituents can be determined, a corresponding volume can be added to the portions being produced to thus compensate, or reduce to a minimum, the weight variations which would arise through the drawing off of the hard constituents.

The device 6, 19, 40 for determining the drawn-off amount of hard constituents can comprise a conveying device 6, which is arranged at the outlet 14 or in the discharge pipe 15 of the separating device 5 as well as a control device 19 for computing the amount. A conveying device of this nature can for example be a toothed wheel or vane pump, but also a reciprocating pump or a screw pump, etc.

Here, a differentiation can be made between an active and a passive device. First of all, the active device 6, 19, 40 is described. Here the conveying device 6 is driven by a motor. The separated volume can be determined via the drive of the conveying device 6, e.g. the pump. This occurs for example using the rotated angle of the pump shaft and the amount taken in by the pump. The separation can in this respect occur in dependence of the throughput of the meat mincing machine. Since this throughput is however difficult to acquire, the separation occurs in dependence of the throughput of the conveying mechanism 9, here the vane pump 9, which charges the meat mincing machine 1 and the throughput of which can be determined very accurately.

For this purpose, a direct coupling between the drive of the conveying mechanism 9 of the filling mincer and the drive of the conveying device 6, for example by means of a gear train, is conceivable. With separate drives a separation independent of the throughput is however conceivable. This active device permits a continual separation which is in the end independent of pressure variations. Blockages and constrictions of the separating device 5 are excluded by the driven and controlled drawing off of the separated product.

With the passive device the conveying device 6 is driven by the pressure and the movement of the drawn-off amount of hard constituents. As described in conjunction with the active device, a pump, for example a toothed wheel or vane pump or also a reciprocating pump or screw pump can be used here. Additionally, a measurement device, illustrated by the broken line 40, is provided which determines the amount of drawn-off hard constituents. A measurement device of this nature determines for example again the rotated angle of a pump shaft, wherein the throughput in a certain time can be calculated in a simple manner via the amount taken in by the pump. With the passively driven embodiment the conveying device can be braked in a controlled manner, for which an appropriate brake is provided which is not illustrated, to reduce the throughput through the conveying device 6. This occurs so that, due to the separated volume, the amount of meat fed additionally to the meat mincing machine does not increase such that in turn more is separated and the closed-loop control oscillates uncontrollably upwards. The brake can be controlled by the controller 19.

Another variant of the passive device is, for example, a flow-rate measurement system 40, which determines the flow rate of the separated product, wherein the flow-rate measurement system can be preceded or followed by a flow control valve. The flow control valve can also be controlled by the control device 19. Another possibility exists in that a continuously operating weighing system for the determination of the drawn-off amount of hard constituents is used.

It is also possible to provide a container 16 at the outlet 14 or the discharge pipe 15 with a predetermined volume, the said container running full in a certain time so that the drawn-off volume in a certain time can be determined. The container can then be emptied at regular intervals.

Irrespective of whether an active or passive device is used, it is essential that the drawn-off amount of hard constituents can be determined which is drawn-off per unit time, or which is drawn-off for a certain amount of meat to be minced.

The meat, which is not drawn-off into the discharge pipe 15 by the separating device 5, is then in a manner known per se pressed through the openings in the final perforated disc 4 and is for example in portions ejected into a filling tube 13 (refer to FIG. 2) for filling sausage casings. The minced foodstuff can also be subdivided after ejection through the final perforated disc 4 into individual portions, for example single portions of minced meat.

However, the amount of drawn-off hard constituents is lacking in the production of these portions. Consequently, too little minced foodstuff or minced meat is passed to the portions to be produced so that weight variations arise in the individual portions.

Since according to the disclosure however the device 6 is provided for the determination of the drawn-off amount of hard constituents or of the amount of separated product, this lacking amount or this lacking volume can be added to the portions to compensate for the weight variations and to reduce them to a minimum.

For this purpose, for example a control device 19 is provided to which a signal is passed which corresponds to the drawn-off amount of hard constituents. This signal is for example passed from the device 6 to the controller 19 for the determination of the drawn-off amount of hard constituents. The controller 19 then controls for example the conveying mechanism 9 so that an appropriate amount of foodstuff to be minced is additionally fed to the portions being produced in dependence of the determined drawn-off amount of hard constituents. The conveying mechanism 9 is controlled such that the conveying rate is increased so that the determined amount of drawn-off hard constituents is compensated, i.e. the drawn-off volume is additionally fed by increasing the conveying rate.

Figure 6:
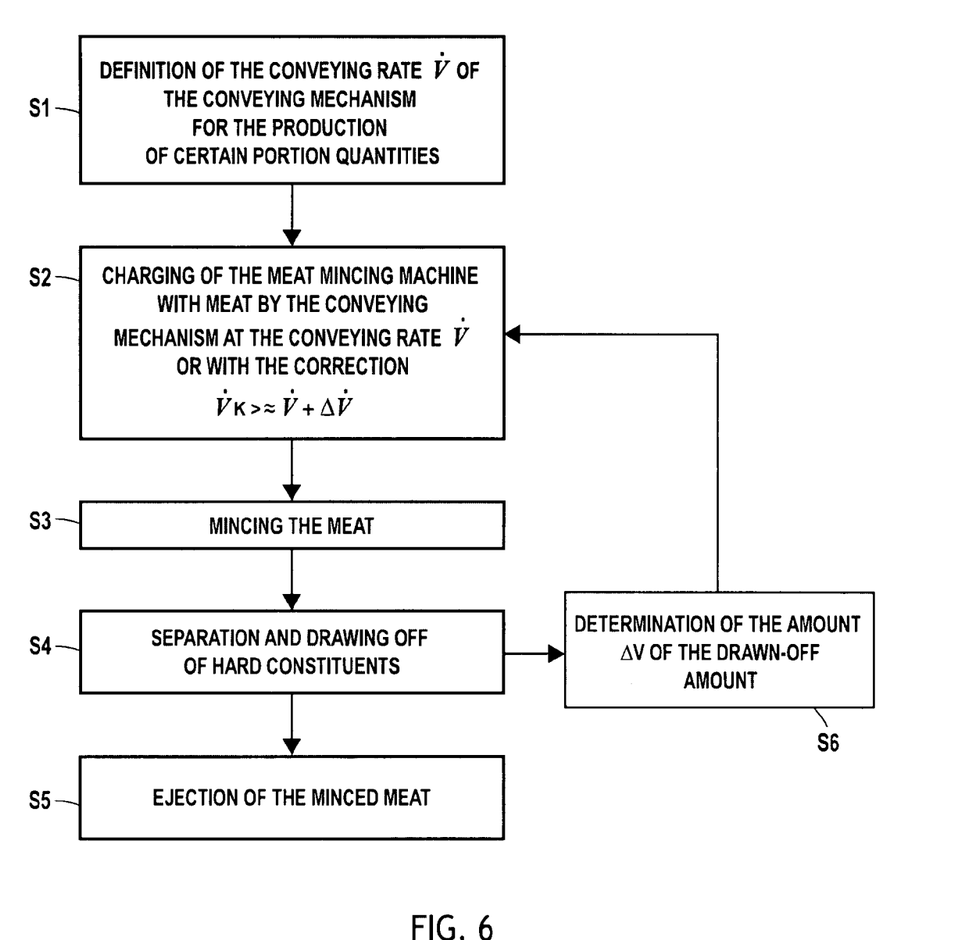

FIG. 6 illustrates a flow chart which explains the method according to the disclosure in more detail. First of all, a certain conveying rate, i.e. a certain volume flow V of the conveying mechanism is defined for the production of portions of certain amounts (i.e. for the production of subdivided single portions with a certain mass) (step S1). This amount can be entered into the control device 19 which controls the conveying mechanism 9 so that the previously coarsely chopped meat, which for example was fed via the hopper 25, is conveyed by the conveying mechanism with the specified conveying rate V (step S2).

The meat is then conveyed via the feed pipe 11 to the appropriate set of cutters with the various blades 3 and perforated discs 4. Here, the meat is minced further for example by the precutters 3*a, b*, pressed through the coarsely perforated disc 4*a* and minced further by the separating cutter 3*c* (step S3).

In this embodiment the separating device 5 comprises for example, as previously explained, the hollow arm cutter 3*c*, which passes the hard constituents, which cannot be pressed through the final perforated disc 4, through the outlet 14 into the discharge pipe 15, so that the hard constituents are separated and drawn off (step S4) whereas the minced meat is ejected through the final perforated disc 4 (step S5). The volume flow, which is ejected through the final perforated disc 4, is however lacking the volume $\Delta V$ of hard constituents, which has been separated and drawn-off by the separating device 5.

In step S6 the amount $\Delta V$ of the drawn-off amount of hard constituents is, as previously described, determined by the active or passive device 6, i.e. by specific control of the conveying device 6 or by measurement of the amount of separated product. A corresponding signal is passed to the control device 19, which then in turn increases the volume flow V with which the meat mincing machine 1 is charged such that the volume flow $\Delta V$ which is drawn-off in step S4 is compensated. This means that with a correction of the production process the conveying mechanism 9 increases the conveying rate to about $V_k > \sim V + \Delta V$. The amount to be additionally fed for compensation of the separated volume $\Delta V$ must be somewhat greater than the separated volume, because a certain percentage proportion is also separated from the compensating volume.

According to the preferred embodiment, with the active device 6 the amount of the separated product is defined at the start in dependence of the quality of the foodstuff to be minced and controlled such that the amount of separated product can be acquired with regard to quantity. The starting material is generally supplied to the meat processing facilities ready-cut in defined quality classes. In dependence of the quality class the percentage is then defined, for example between 3 and 5%, which is drawn-off from the total flow via the conveying device 6. Here, the conveyed amount of the conveying device 6 is set, for example in dependence of the throughput of the conveying mechanism 9. The previously set amount of separated product must however still be optimized. The setting of the amount of separated product occurs on the basis of the colour of the separated product. With a high red proportion of the separated product it contains too much valuable muscular meat, i.e. too much is being separated, so that the conveying rate of the conveying device 6 is too high. If the separated product is only white, there is the risk that insufficient hard parts are being separated and for example too much connective tissue is being ejected into the finished portions or the final perforated disc 4 has become blocked. It must therefore be ensured that a certain proportion of meat, that is a red proportion, is contained in the separated product which can be detected by its color. The setting to be carried out can be realized or automated by one or more sensors, in particular optical color sensors. As can be seen from FIG. 7, at least one color sensor 31 is provided. Three sensors 31 are provided in FIG. 7. The color sensors can be provided, as can be seen from FIG. 7, either on the outlet of the separator 5 and/or on the outlet of the meat mincing machine and/or in the region of the separating device 5. In the separating device 5 the sensor 31 can be arranged for example in the region of the hollow arm cutter 3b and the perforated disc 4, where the hard parts collect, before they are pressed into the radial channels of the hollow arm cutter 3b.

Figure 7:
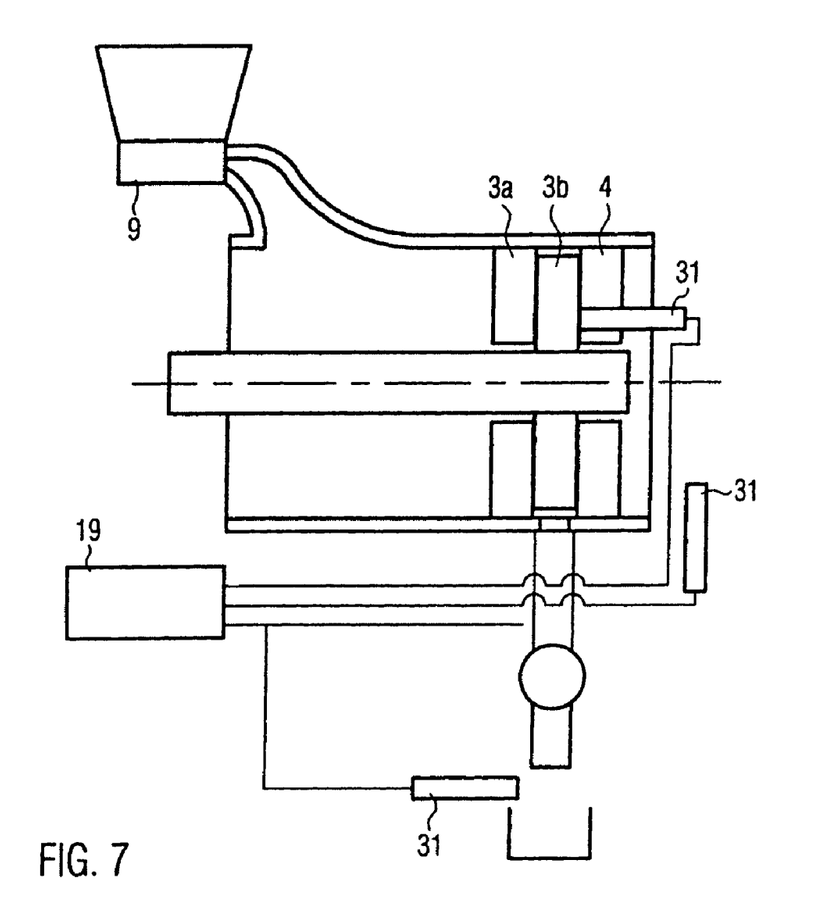
Figure 8:
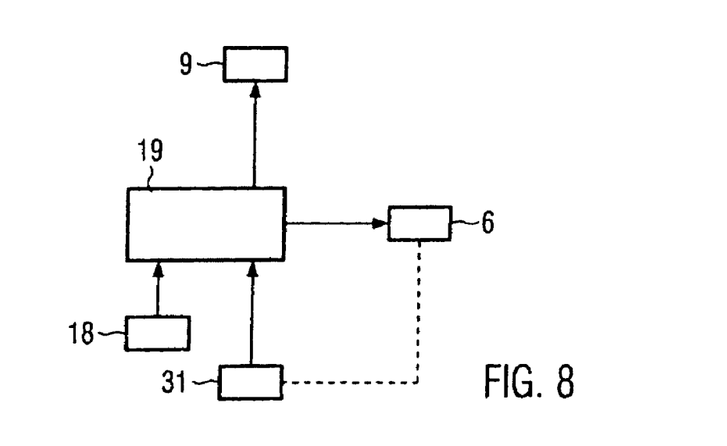

The color sensors 31 give a corresponding signal to the controller 19, as can be seen from FIG. 8.

As follows from the block diagram illustrated in FIG. 8, the conveying device 6 is controlled by the controller 19 to draw off a certain amount of separated product in a controlled manner. The amount of separated product is defined based on the quality of the starting material, i.e. for example the percentage of meat to be minced which is to be separated. This value is for example entered via an input device 18 into the controller 19. Furthermore, as previously described, the conveyed amount V for the conveying mechanism 9 is also defined, wherein the control device 19 determines the amount conveyed by the conveying device 6 in dependence of the conveying rate of the conveying mechanism 9 as well as the previously defined proportion of separated product and controls the conveying device 6 appropriately. The at least one colour sensor 31 then determines the red or white proportion of the separated product and/or of the minced meat and issues a corresponding signal to the control device 19 which compares this signal with a set value or set-value range. If the determined value deviates from a set value, wherein for example the red proportion of the separated product is too high, then the conveying rate of the conveying device 6 is reduced. If the red proportion is too little, the control device 19 increases the conveying rate of the conveying device 6. The amount of separated product can thus be ideally set. As also explained in conjunction with FIG. 6, the conveying rate of the conveying mechanism 9 is then adapted for the compensation of the drawn-off amount of separated product corresponding to the determined amount of separated product.

Through the addition of the separated volume for the weight compensation, the production of portions with accurate weight is possible. A controlled separation, independent of the pressure, is possible. Due to the fact that the drawn-off amount of hard constituents can be continuously determined, corrective intervention in the production process can be carried out any time and without time delay.

With the example illustrated in FIG. 6 the drawn-off amount has been determined as a change in the volume per unit time. It is however also possible to determine the drawn-off amount of hard constituents for a certain amount of foodstuff to be minced and then to adapt the conveying rate of the conveying mechanism accordingly.

Although the above embodiments have been described in connection to meat, the invention is in no way restricted to the processing of meat, but rather can also be used for the mincing of other foodstuffs which have hard constituents which cannot be adequately minced.

The invention claimed is:

1. Meat mincing machine for producing minced foodstuffs, comprising an inlet, at least one blade, at least one following perforated disc, a separating device for separating and drawing off hard constituents with a device for determining the amount of separated product drawn off by the separating device, and a control device which causes a corresponding amount of minced foodstuff to be fed additionally to the portions to be produced in dependence of the determined amount drawn off by the separating device.

2. Meat mincing machine according to claim 1, wherein the meat mincing machine comprises a conveying mechanism or can be connected to a conveying mechanism which charges the meat mincing machine with foodstuffs to be minced.

3. Meat mincing machine according to claim 1, wherein the device for determining the amount of separated product comprises a conveying device, which is arranged one of at the outlet or in a discharge pipe of the separating device.

4. Meat mincing machine according to claim 3, wherein the conveying device is a pump.

5. Meat mincing machine according to claim 3, wherein the conveying device can be driven by a motor, wherein the amount conveyed by the conveying device corresponds to the amount of product separated by the separating device.

6. Meat mincing machine according to claim 5, wherein the amount conveyed by the conveying device depends on one of the throughput of the meat mincing machine or can be set in dependence of the throughput of the conveying mechanism.

7. Meat mincing machine according to claim 6, wherein the drive of the conveying device is coupled to the drive of the conveying mechanism or that the drives are separate.

8. Meat mincing machine according to claim 7, wherein the respective drives are coupled via a gear train.

9. Meat mincing machine according to claim 3, wherein the conveying device is driven by the pressure and the movement of the drawn-off separated product.

10. Meat mincing machine according to claim 9, and a measurement device is provided which determines the conveyed amount via the drive of the conveying device.

11. Meat mincing machine according to claim 3, wherein the device for determining the amount of separated product comprises a control device, which controls one of the conveying device or the controlled brake to draw off in a controlled manner a defined amount of separated product in dependence of the quality of the foodstuff to be minced.

12. Meat mincing machine according to claim 1, wherein the device for the determination of the amount of product separated by the separating comprises a flowmeter.

13. Meat mincing machine according to claim 1, wherein the device for the determination of the amount of product separated by the separating device comprises a continuously operating weighing system.

14. Meat mincing machine according to claim 9, wherein the conveying device comprises a controlled brake.

15. Meat mincing machine according to claim 1, wherein the device for the determination of the amount of separated product to be drawn off determines the volume of the drawn-off amount of separated product.

16. Meat mincing machine according to claim 5, wherein the meat mincing machine moreover comprises at least one sensor, which outputs a signal to a control device in dependence of the composition of the separated product or minced foodstuff.

17. Meat mincing machine according to claim 16, wherein the control device controls one of the conveying device or the controlled brake in dependence of the signal.

18. Meat mincing machine according to claim 16, wherein the sensor is a color sensor which in particular determines the red or white proportion of the separated product or minced foodstuff.

19. Meat mincing machine according to claim 16, wherein the at least one sensor is arranged one of at the outlet of the separating device, the outlet of the meat mincing machine, or in the region of the separating device.

20. Meat mincing machine according to claim 1, wherein the control device controls the conveying mechanism such that the conveying rate is increased such that the determined amount of the drawn-off separated product is compensated.

21. Method of producing minced foodstuff, with a meat mincing machine, with the following steps:
- feeding of coarsely chopped foodstuff to an inlet,
- pressing foodstuff against at least one of the machine to be minced,
- separating and drawing off hard constituents with a separating device of the machine,
- pressing the minced foodstuff through at least one perforated disc of the machine,
- determining the amount of product separated by the separating device, and
- feeding a corresponding volume of minced foodstuff to the portions in dependence of the determined drawn-off amount of separated product.

22. Method according to claim 21, and determining the volume of the drawn-off amount of separated product.

23. Method according to claim 22, and determining the drawn-off amount of separated product in the form of one of the volume, the mass, or the temporal progression of the drawn-off amount of separated product.

24. Method according to claim 22, wherein the drawn-off amount of separated product is continuously determined during the process.

25. Method according to claim 21 and arranging a conveying device, which is driven by a motor and the conveyed amount of which is previously determined and set, on an outlet or discharge pipe of the separating device.

26. Method according to claim 25, wherein the amount conveyed by the conveying device is determined and set in dependence of the conveyed amount of a conveying mechanism arranged at the inlet of the meat mincing machine.

27. Method according to claim 21, wherein a conveying device arranged after the separating device is driven by the pressure or by the movement of the drawn-off separated product.

28. Method according to claim 27, wherein the amount of separated product is set by a controlled brake of the conveying device.

29. Method according to claim 27, wherein the amount of separated product is determined by means of a measurement device.

30. Method according to claim 21, wherein the flow rate of the drawn-off amount of separated product is determined in a discharge pipe after the separating device.

31. Method according to claim 21, wherein the composition of the separated product or of the minced foodstuff is determined using a sensor.

32. Method according to claim 31, wherein the amount separated by the separating device is set in dependence of the sensor signal.

33. Method according to claim 21, and controlling a conveying mechanism, which charges the meat mincing machine, such that the conveying rate is increased such that the determined amount of separated product is compensated.

34. Method according to claim 21, wherein the amount conveyed by the conveying device is defined in dependence of the quality of the foodstuff to be minced so that the separated product is drawn-off in a controlled manner.

35. Method according to claim 31, wherein the sensor is a color sensor.

36. Meat mincing machine for producing minced foodstuffs comprising an inlet; at least one blade; at least one following perforated disc; a separating device for separating and drawing off hard constituents with a device for determining the amount of separated product drawn-off by the separating device; a control device which causes a corresponding amount of minced foodstuff to be fed additionally to the portions to be produced in dependence of the determined amount drawn off by the separating device; the device for determining the amount of separated product comprises a conveying device, which is arranged at the outlet or in a discharge pipe of the separating device; the conveying device can be driven by a motor, wherein the amount conveyed by the conveying device corresponds to the amount of product separated by the separating device; and at least one sensor, which outputs a signal to the control device in dependence of the composition of the separated product or minced foodstuff.

37. Meat mincing machine according to claim 36, wherein the control device controls the conveying device or a controlled brake in dependence of the signal.

38. Meat mincing machine according to claim 36, wherein the at lest one sensor is a color sensor which determines the red or white proportion of the separated product or minced foodstuff.

39. Meat mincing machine according to claim 36, wherein the at least one sensor is arranged one of at the outlet of the separating device, the outlet of the meat mincing machine, or in the region of the separating device.

40. Method of producing minced foodstuff, with a meat mincing machine the method comprising:
- feeding coarsely chopped foodstuff to an inlet of the machine,
- pressing the foodstuff against at least one blade of the machine to be minced,
- separating and drawing off hard constituents with a separating device of the machine,
- pressing the minced foodstuff through at least one perforated disc of the machine,
- determining an amount of product separated by the separating device of the machine,
- feeding a corresponding volume of minced foodstuff to portions in dependence of the determined drawn-off amount of separated product, and
- determining the composition of the separated product or of the minced foodstuff using a sensor.

41. Method according to claim 40, wherein the amount separated by the separating device is set in dependence of the sensor signal.

42. Method according to claim 40, wherein the sensor is a color sensor.

43. Meat mincing machine for producing minced foodstuffs comprising an inlet, at least one blade, at least one following perforated disc, a separating device for separating and drawing off hard constituents with a device for determining the amount of separated product drawn-off by the separating device, a control device which causes a corresponding amount of minced foodstuff to be fed additionally to the portions to be produced in dependence of the determined amount drawn off by the separating device, and wherein the control device controls the conveying mechanism such that the conveying rate is increased such that the determined amount of the drawn-off separated product is compensated.

44. Method of producing minced foodstuff, with a meat mincing machine, the method comprising:
- feeding coarsely chopped foodstuff to an inlet of the machine,
- pressing the foodstuff against at least one blade of the machine to be minced, separating and drawing off of hard constituents with a separating device of the machine, pressing the minced foodstuff through at least one perforated disc of the machine, determining the amount of product separated by a separating device of the machine, feeding a corresponding volume of minced foodstuff to portions in dependence of the determined drawn-off amount of separated product, and controlling the conveying mechanism of the machine with a control device such that the conveying rate is increased such that the determined amount of the drawn-off separated product is compensated.

* * * * *